United States Patent [19]
Shuert

[11] Patent Number: 5,389,177
[45] Date of Patent: Feb. 14, 1995

[54] THERMOFORMING PROCESS FOR MAKING A TWIN SHEET PLASTIC STRUCTURE INCLUDING CAPTURED METALLIC ELEMENT

[76] Inventor: Lyle H. Shuert, 1034 Stratford Pl., Bloomfield Hills, Mich. 48013

[21] Appl. No.: 951,894

[22] Filed: Sep. 28, 1992

Related U.S. Application Data

[63] Continuation-in-part of Ser. No. 606,173, Oct. 31, 1990, abandoned.

[51] Int. Cl.$^6$ .................. B29C 51/10; B29C 51/12
[52] U.S. Cl. .................. 156/245; 156/292; 156/285; 264/511; 264/516
[58] Field of Search .............. 264/511, 516, 545, 515, 264/512; 156/145–147, 292, 293, 285, 245

[56] References Cited

U.S. PATENT DOCUMENTS

| | | | |
|---|---|---|---|
| 1,310,442 | 7/1919 | Roberts | 156/292 |
| 1,575,388 | 3/1926 | Roberts | 156/292 |
| 2,726,925 | 12/1955 | Saulino | 156/145 |
| 3,396,430 | 8/1968 | Westcott . | |
| 3,467,741 | 11/1967 | Kesling | 264/92 |
| 3,598,463 | 8/1971 | Kesling | 312/214 |
| 3,610,173 | 10/1971 | McIlwraith | 108/57 |
| 3,655,847 | 4/1972 | Hayashi | 264/516 |
| 3,699,902 | 10/1972 | Aligeyer et al. | 108/58 |
| 3,736,201 | 5/1973 | Teraoka | 264/545 |
| 3,757,704 | 9/1973 | Allgeyer et al. | 108/51 |
| 3,832,955 | 9/1974 | Pottinger et al. | 108/51 |
| 3,867,088 | 2/1975 | Brown et al. | 425/504 |
| 4,397,247 | 9/1983 | Lemelson | 108/57.1 |
| 4,415,393 | 11/1983 | Grimes | 156/293 |
| 4,818,320 | 4/1989 | Weichselbaum | 156/293 |

FOREIGN PATENT DOCUMENTS

| | | | |
|---|---|---|---|
| 60-024917 | 2/1985 | Japan | 264/515 |
| 60-236855 | 11/1985 | Japan | 264/516 |
| 60-260316 | 12/1985 | Japan | 264/516 |
| 61-072520 | 4/1986 | Japan | 264/516 |

*Primary Examiner*—Catherine Timm
*Attorney, Agent, or Firm*—Young, MacFarlane & Wood

[57] ABSTRACT

A method of forming a metal and plastic composite structure including providing an elongated metallic element; providing first and second plastic sheets; heat forming the first and second plastic sheets to form first and second preformed plastic parts; and, following the individual heat forming of the parts and with the parts in a hot flowable state, assembling the plastic parts and the metallic element by fusing portions of the parts together with the metallic element positioned therebetween to form a composite assembly comprising a twin sheet plastic structure with the metallic element sandwiched therebetween. Also disclosed are composite structures, including a motor vehicle head rest and a seat back for a motor vehicle seat assembly, constructed in accordance with the invention methodology.

3 Claims, 7 Drawing Sheets

THERMOFORMING PROCESS FOR MAKING A TWIN SHEET PLASTIC STRUCTURE INCLUDING CAPTURED METALLIC ELEMENT

This application is a continuation-in-part of U.S. Patent application Ser. No. 606,173, filed Oct. 31, 1990, abandoned. This invention relates to composite structures and more particularly to composite structures including plastic and metallic members.

FIELD OF THE INVENTION

BACKGROUND OF THE INVENTION

Composite structure including plastic and metallic members are attractive in that they combine the inexpensive and readily formable characteristics of plastic material with the high strength characteristics of metallic material. However, past attempts to combine plastic and metallic members, in an attempt to combine the positive features of each in a single structure, have been limited by the high cost of such structures, the difficulties encountered in fabricating such structures, or the lack of durability of such structures.

SUMMARY OF THE INVENTION

This invention is directed to the provision of a composite plastic and metal structure that is inexpensive, easy to fabricate, and durable.

The composite structure of the invention includes a first sheet of thermoformable plastic; a second sheet of thermoformable plastic; and a metallic member having first and second adjoining portions. The sheets are selectively thermoformed and selectively fused together to form a hollow twin sheet plastic structure having an external wall and an opening defined in the external wall providing access to the hollow interior of the plastic structure, and the metallic member is positioned in the opening to position the first portion of the metallic member within the hollow plastic structure and position the second portion of the metallic member exteriorally of the hollow plastic structure. The sheets are thermoformed such that a thermoformed portion of one of the sheets embraces a first portion of the circumference of a section of the first portion of the metallic member and a thermoformed portion of the second sheet embraces a second portion of the circumference of the section of the first portion of the metallic member and coacts with the first sheet to embrace the section therebetween. This arrangement effectively combines the inexpensive and formability features of a twin sheet plastic structure with the high strength characteristics of a metallic member.

According to a further feature of the invention, the thermoformed portions of the first and second plastic sheets, when positioned together, define a closed space therewithin corresponding generally in size and shape to the circumference of the metallic member so as to substantially totally embrace the metallic member circumference therewithin and are fused together at spaced locations around the circumference to trap the section of the metallic member therebetween. This arrangement firmly encapsulates the metallic member within the plastic structure.

According to a further feature of the invention, the thermoformed portions of the sheets are proximate the opening in the external wall of the plastic structure and serve to define the opening in the external wall at one end of the thermoformed portions. This arrangement allows the metallic member to be securely embraced as it passes through the opening and into the hollow of the plastic structure.

According to a further feature of the invention, the metallic element comprises a rod and the adjoining portions of the metallic element comprise rod portions arranged serially along the lengthwise axis of the rod. The use of a rod facilitates the incorporation of the metallic member in the composite Structure and imparts the high strength characteristics of a rod to the structure.

According to a further feature of the invention, the rod includes a section of U-configuration comprising spaced leg portions joined by a bight portion; the external wall of the plastic structure defines two spaced openings; and one of the leg portions passes respectively through each of the openings and the bight portion is positioned within the hollow of the plastic structure. This arrangement provides a positive securement of a U-shaped rod member within a twin sheet plastic structure.

According to a further feature of the invention, the first and second plastic members comprise, respectively, front and rear plastic members; the front plastic member includes a generally planar main body portion and a finger portion extending rearwardly from the main body portion; the rear plastic member is fused to the front plastic member to form the hollow plastic structure and includes a main body portion spaced rearwardly from the main body portion of the front plastic member and a finger portion extending forwardly from the main body portion and coacting with the rearwardly extending finger portion of the front member to define a passage therebetween within the plastic structure extending generally transversely of the finger portions; and the portion of the metal rod within the hollow of the plastic structure passes through the passage. This arrangement allows the front and rear plastic sheets to coact to define a restraining passage construction within the hollow of the structure to position the rod within the structure.

According to a further feature of the invention, the rearwardly extending finger portion of the front plastic member extends substantially to the main body portion of the rear plastic member and the forward extending finger portion of the rear plastic member extends substantially to the main body portion of the front plastic member. This arrangement allows the finger portions to reinforce the plastic structure and provide crush resistance for the plastic structure so that the structure may be used, for example, in the formation of an automotive headrest.

According to a further feature of the invention, the front and rear plastic members each include a peripheral lip portion; the peripheral lip portions are fused together to define a hollow volume between the members; and the opening in the external wall of the plastic structure for passage of the rod is provided between the fused together lip portions of the front and rear members. This arrangement provides a rigid composite structure in which the rod member is firmly grasped as it enters the hollow of the plastic structure by the fused together portions of the lip portions of the front and rear members.

According to a further feature of the invention, the composite structure is utilized in the formation of an automotive seat back, the first and second plastic members are thermoformed to coact to form an annular frame having a hollow cross section; and the metallic member comprises a wire element passing through a seam formed by fused together portions of the first and second plastic parts to dispose a first portion of the element within the hollow of the frame and a second portion of the element outside of the hollow.

The invention also provides an improved method of forming a metal and plastic composite structure. According to the invention methodology, a metal element is provided having first and second adjoining portions; a first plastic sheet is provided; a second plastic sheet is provided; the first and second plastic sheets are heat formed; and, with the plastic sheets in a hot flowable state, the plastic sheets and metallic elements are assembled by fusing portions of the sheets together with the first portion of the metallic element sandwiched therebetween to form a composite assembly comprising a hollow plastic structure formed by the fused together first and second plastic sheets with the first portion of the metallic element sandwiched therebetween and with the second portion of the metallic element positioned exteriorally of the plastic structure. This methodology provides a convenient, effective and inexpensive process for forming a composite metal and plastic structure such, for example, as an automotive headrest.

According to a further feature of the invention methodology, utilizable for example in the formation of an automotive seat back, the first and second plastic sheets are thermoformed to form first and second plastic parts; the metallic element comprises a wire element; following the formation of the plastic parts, and with the parts still in a hot flowable state; the plastic parts and the wire element are assembled to form a composite structure with a portion of the wire element positioned in a void defined by the coacting parts and a further portion of the wire element positioned outside of the void but enclosed by the parts; and, following the assembly step, the portions of the parts enclosing the further wire element portion are removed to expose the further wire element portion.

DETAILED DESCRIPTION OF THE PREFERRED EMBODIMENT

It will be understood that the invention is applicable to a wide variety of composite structures involving plastic and metallic elements and that the headrest and seat backs illustrated and described in detail herein are merely exemplary of the many composite structures that may be formed utilizing the teachings of the invention.

The headrest illustrated and described herein comprises a front plastic member 10, a rear plastic member 12 and a rod 14. In broad overview, the front and rear plastic members, following suitable individual thermoforming, are joined together in a fusing operation to form a hollow composite structure with a portion of the rod 14 trapped within the hollow of the plastic structure to form the composite structure.

Front and rear members 10 and 12 are formed from a suitable thermoformable plastic material such, for example, as a high density polyethylene and are formed in a suitable heat forming operation such as vacuum forming.

Figure 6:
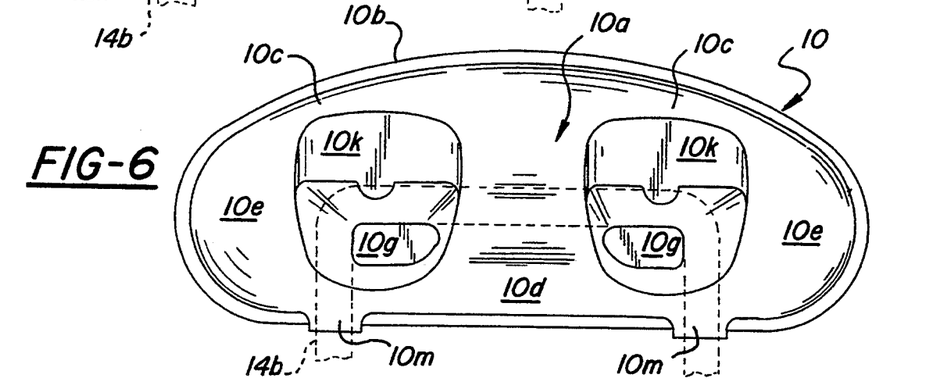
FIG. 6 is an elevational view of a front plastic member utilized in the headrest.
Figure 7:
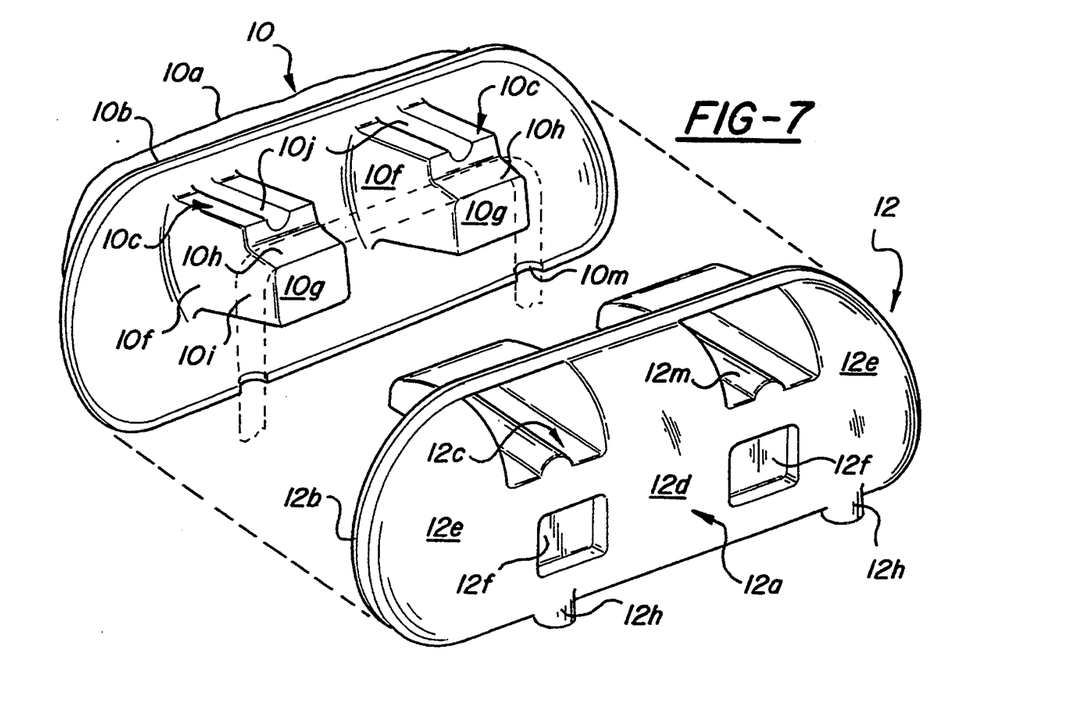
FIG. 7 is a exploded perspective view of the front and rear plastic members of the headrest with the front plastic member in the foreground.
Figure 8:
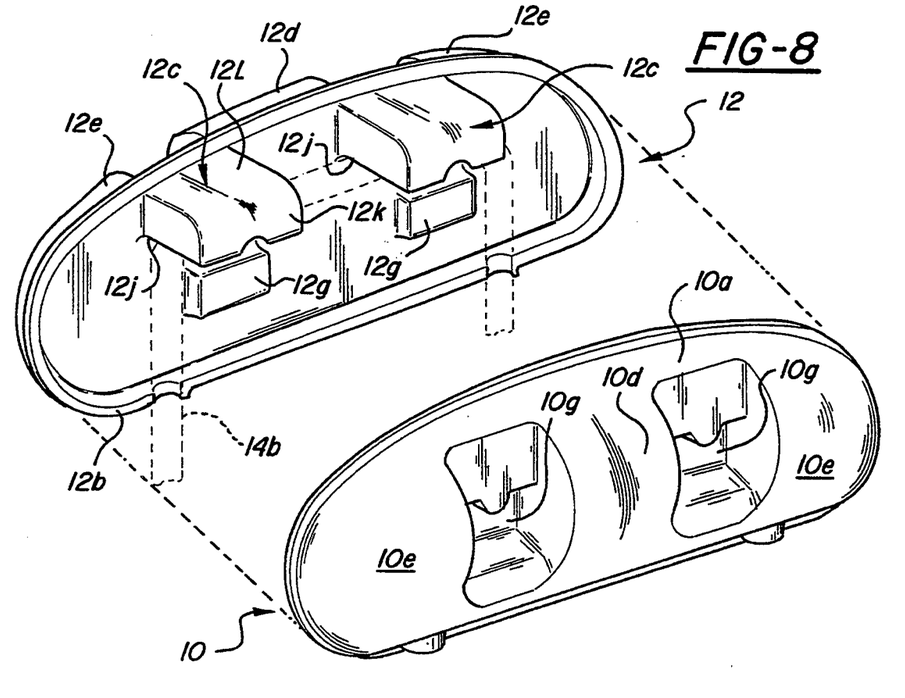
FIG. 8 is an exploded perspective view of the front and rear plastic members Of the headrest with the front plastic member in the foreground.

Front plastic member 10 includes a main body portion 10a of generally elliptic configuration, a lip portion 10b circumferentially surrounding main body portion 10a, and a pair of spaced finger portions 10c extending rearwardly from main body portion 10a. Finger portions 10c open in the front face of main body portion 10a and divide main body portion 10a into a central section 10d and end sections 10e.

Each finger portion 10c includes a tubular body portion 10f and a nose portion 10g at the rear end of the finger portion and coacting with body portion 10f to define a transverse arcuate surface or saddle 10h and a vertical arcuate surface 10i blending smoothly in curvilinear fashion at its upper end with arcuate surface 10h. The body portion 10f of each finger portion further defines a rearwardly extending groove 10j in the upper face of the body portion. A wall 10k, inset with respect to the general curvilinear plane of main body portions 10d and 10e, extends upwardly from the upper face of each finger body portion 10f and blends at its upper edge with main body portions 10l overlying the respective fingers and interconnecting main body portions 10d and 10e. A pair of spaced semicircular socket portions 10m are formed in the lower edge of lip 10b.

Figure 5:
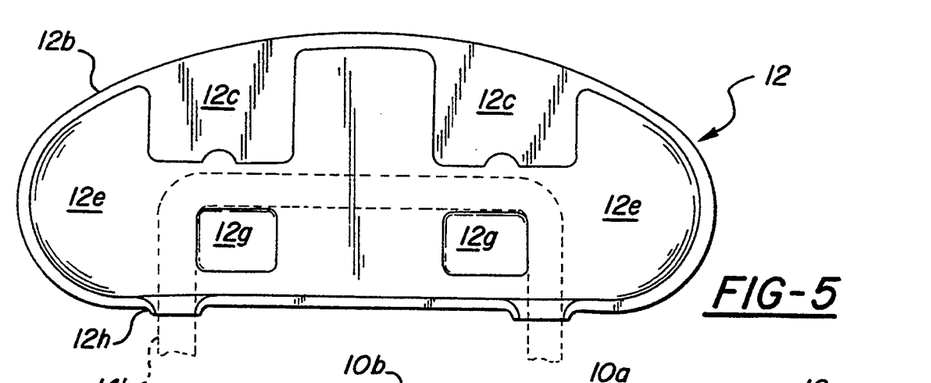
FIG. 5 is an elevational view of a rear plastic member utilized in the headrest.

Rear plastic member 12 has an overall elliptic shape generally conforming to the overall shape of front member 10 and includes a generally planar main body portion 12a, a lip portion 12b circumferentially surrounding main body portion 12a and conforming in size and shape to the lip portion 10b of front member 10, and a pair of finger portions 12c extending forwardly from main body portion 12a and opening in the rear face of the rear member to divide the main body portion 12a into a central section 12d and end sections 12e. A pair of depressions 12f are also formed in the rear face of the rear member in respective underlying relation to the fingers 12c to define pads 12g on the front face of the rear member. A pair of spaced semicircular socket portions 12h are formed in the lower edge of lip 12b and conform in size and positioning to sockets 10m formed along the lower edge of lip portion 10b of front member 10.

Each finger 12c includes a bottom wall 12i having a width corresponding generally to the width of fingers 10c and blending at its rear end into main body portion 12a via a radiused surface 12j; a front wall 12k conforming in size and configuration to wall 10k of the front member; and an upper wall 12l conforming in size and configuration to main body portion 10l of front member 10. A rib 12m formed in the bottom wall 12i of each finger 12c corresponds in size and shape to the grooves 10l formed in the upper walls of the fingers 10c of the front member and coact with the grooves 12c in the assembled relation of the front and rear parts to define stiffening ribs of circular cross section.

Rod 14 has a generally U-shaped configuration and may be formed of any suitable bar stock such as steel. Bar 14 includes vertical leg portions 14a and 14b joined at their upper ends by a bight portion 14c. The length of bight portion 14c corresponds generally to the distance between socket portions 10m on front part 10 and socket portions 12h on rear part 12.

In the formation and assembly of the invention composite structure, plastic parts 10 and 12 are suitably thermoformed, preferably in a vacuum-forming operation, from individual sheets of plastic and the front and rear parts, while still in a hot flowable state, are brought together with rod 14 sandwiched therebetween to form a twin sheet structure with the rod bight portion 14c enclosed within the hollow of the structure and rod leg portions 14a, 14b projecting out of the structure. Specifically, with the bight portion 14c of the rod positioned over nose portions 10g of fingers 10c of front member 10 and leg portions 14a, 14b positioned in sockets 10m defined by the lip portion 10b of the front member, the rear member 12 is fitted against the front member and the front and rear members are fused together at all points and areas where they come in contact since the parts are still in a hot flowable state.

Specifically, lip portion 10b of part 10 fuses to lip portion 12b of part 12 so that socket portions 10m and 12h coact to define generally circular openings along the lower edge of the composite twin sheet structure for passage of the respective rod leg portions 14a, 14b; nose portions 10g of legs 10c fuse to pads 12g; bottom walls 12i of fingers 12c fuse to the upper face of fingers 10c with ribs 12l overlying grooves 10l to form reinforcing rib structures of generally circular cross section; front wall 12k of fingers 12c fuse to walls 10k of front member 10; and top walls 12l of fingers 12c fuse to main body portions 10l of part 10.

The openings defined by coacting sockets 10m, 12h generally correspond to the cross-sectional dimension of rod leg portions 14a, 14b and, more specifically, are slightly larger than the cross section of the rod portions with the plastic members in a heated state so that, following assembly of the composite structure and cooling of the plastic parts, the plastic material of the socket portions 12h, 10m contracts to firmly grasp the circumference of the respective leg portion and firmly clamp the leg portions between the front and rear members.

Figures 2, 3, 4:
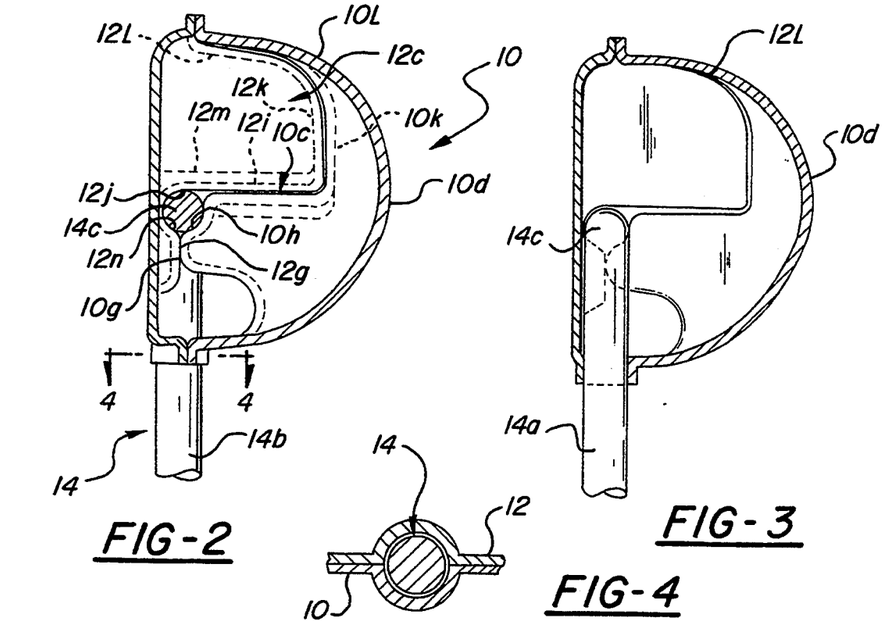
FIGS. 2 and 3 are cross-sectional views taken on lines 2—2 and 3—3 of FIG. 1.
FIG. 4 is a cross-sectional view taken on line 4—4 of FIG. 2.

The bight portion 10h of the rod is also firmly clamped by the fused together front and rear plastic members. Specifically, and as best seen in FIGS. 2 and 3, the radiused surfaces 12j at the rear underside of fingers 12 coact with the upper walls 12n of pad portions 12g and with arcuate surfaces 10h to define a generally circular opening approximating the cross section of the bight portion 14c of the rod so that, following assembly of the parts and cooling of the plastic, the plastic material of fingers 10c and 12c and of pad 12g contract around the circumference of the bight portion of the rod so that the bight portion of the rod is firmly clamped at the two locations within the cavity of the plastic structure where the fingers 10c meet and coact with the respective fingers 12c. The upper end of each leg portion 14a, 14b of the rod is also firmly and positively seated in the arcuate surface 10i defined along the vertical side edges of the fingers 10c.

In the finished composite structure, it will be seen that the fingers 10c of front member 10 extend rearwardly substantially to the main body portion of the rear member and the finger portions 12c of the rear member 12 extend forwardly substantially to the main body portion of the front member so that the fingers, in addition to coacting to define the passages receiving the bight portion of the rod, also provide struts extending between the main body portions of the front and rear plastic member to increase the crush resistance provided by the plastic structure.

Figure 1:
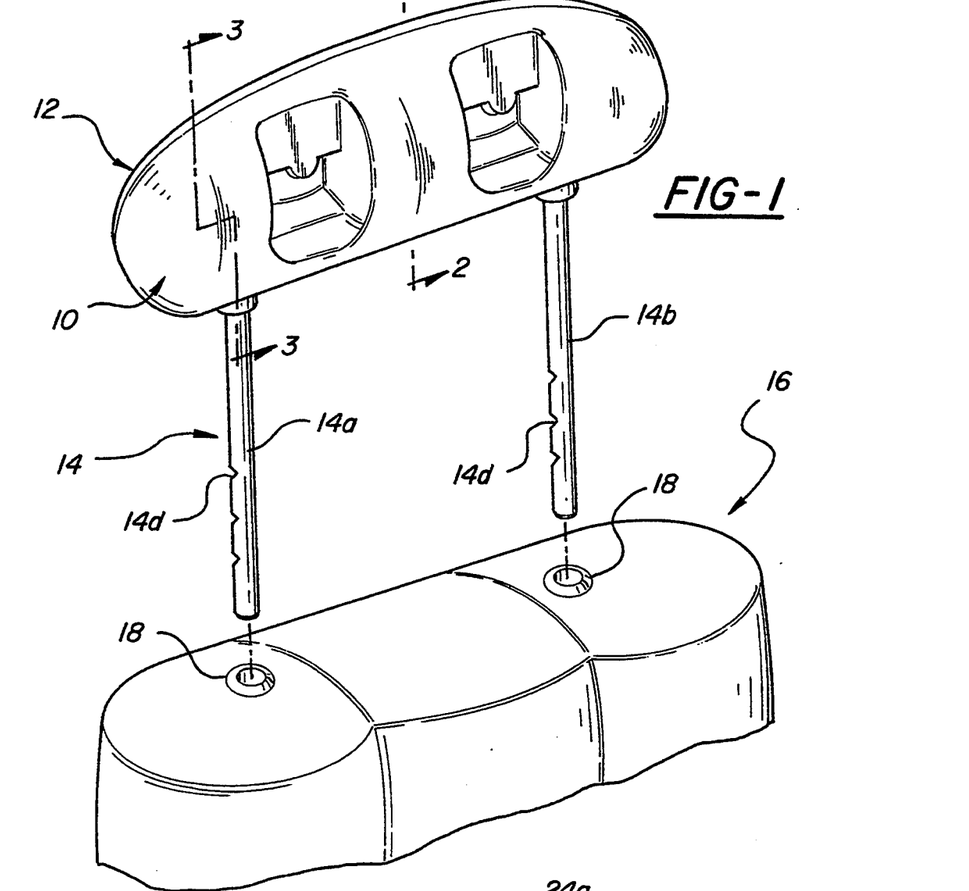
FIG. 1 is a perspective view of a automotive headrest made in accordance with the invention.

The headrest formed according to the invention may be used, as seen in FIG. 1, in known manner in association with a vehicle seat back 16 with the rod leg portions 14a, 14b received in spaced sockets 18 provided in the upper face of the seat back and with notches 14d provided at spaced locations along the leg portion coacting with suitable detent means within the sockets 18 to position the headrest in any desired position of vertical adjustment. While not shown, it will be understood that the plastic material of the headrest, in actual use, will be surrounded by suitable foam or other padding material suitably encased in a fabric material.

In a crash situation involving a rear end collision, the headrest according to the invention functions to provide sufficient crush resistance to the rearwardly moving head of an occupant of the vehicle seat to satisfy the various motor vehicle safety standards governing such matters.

Figure 9:
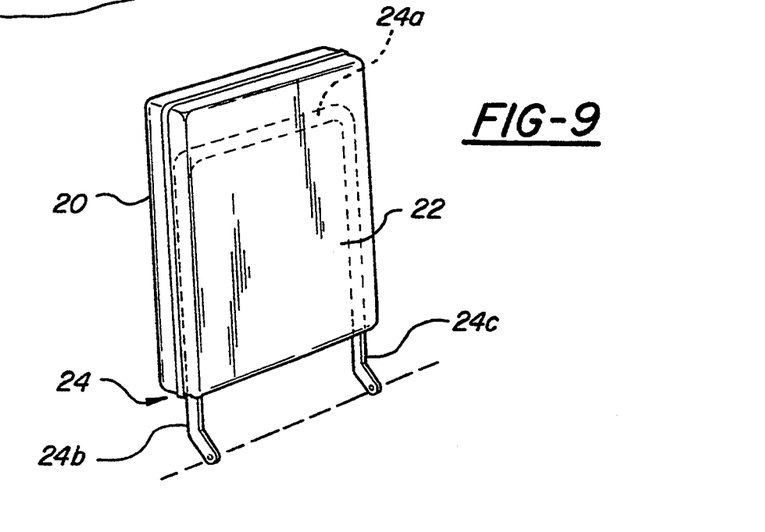
FIG. 9 is a view of a motor vehicle front seat back assembly fabricated in accordance with the invention.

It will of course be obvious, as previously noted, that the invention structure and methodology may be used in the fabrication of a variety of composite structures such, for example, as the seat back assembly seen in FIG. 9 in which the seat back forms the seat back of a front seat assembly of a motor vehicle. In the structure of FIG. 9, the seat back is formed in the manner described herein as a twin sheet structure including front and rear plastic parts 20 and 22 thermoformed and fused together to sandwich a U-shaped rod 24 therebetween with the bight portion 24a of the rod encapsulated within the plastic members and the leg portions 24b, 24c of the rod extending out of suitable apertures provided along the lower edge of the seat back to provide mounting or pivot portions to mount the seat back on the associated seat base.

The invention structure and methodology may also be used in the fabrication of the seat back of a rear seat assembly of a motor vehicle, as illustrated in FIGS. 10–19.

Figures 10, 11, 12:
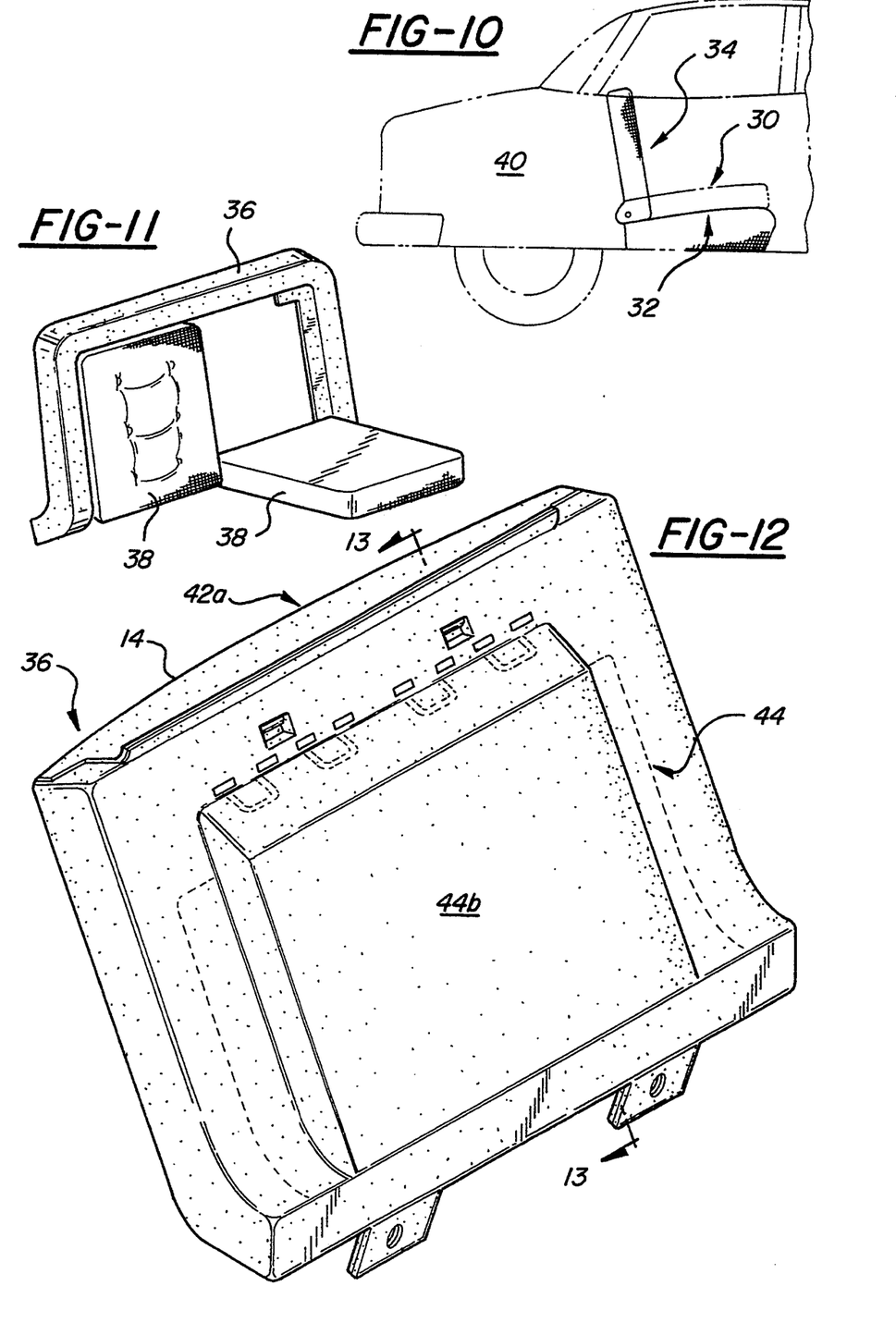
FIG. 10 is a fragmentary schematic view of a motor vehicle including a rear seat back assembly fabricated in accordance with the invention.
FIG. 11 is a perspective view of the seat back assembly of FIG. 10.
FIG. 12 is a perspective view of a plastic frame structure utilized in the seat back assembly of FIG. 11.
Figure 13:
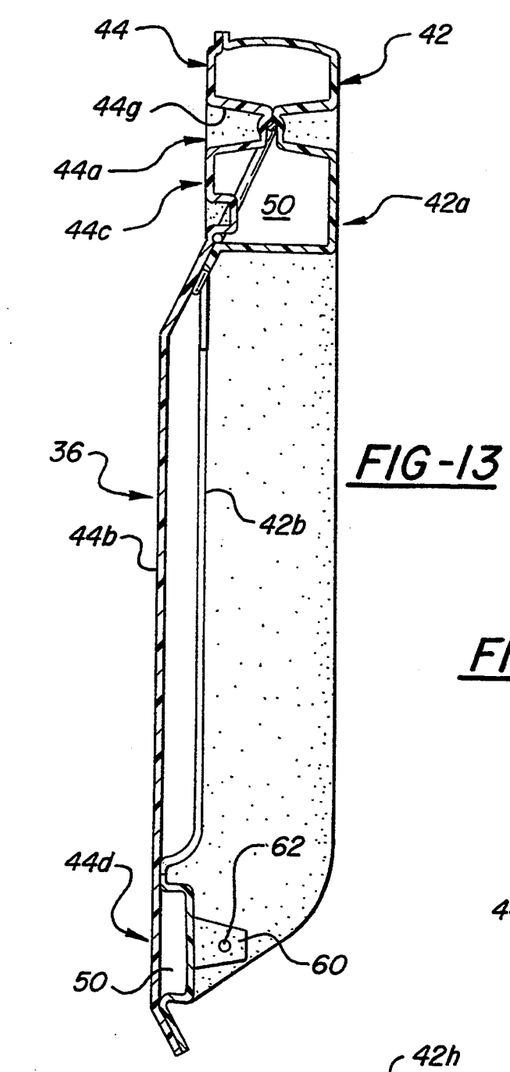
FIG. 13 is a cross-sectional view taken on line 13—13 of FIG. 12.

The rear seat assembly 30 of the motor vehicle includes a seat cushion 32 and a seat back assembly 34. Seat back assembly 34 includes an annular frame structure 36 and a pair of seat cushion assemblies 38 which are individually pivoted proximate their lower edges to pivot means defined by frame 36 so that each cushion assembly may be individually folded forwardly to rest on the seat cushion 32 and provide access to the trunk area 40 of the motor vehicle.

Frame 36 comprises a composite structure formulated in accordance with the features of the present invention. Specifically, frame 36 comprises first and second thermoformed plastic parts 42 and 44 and a pair of metal elements in the form of wire element 46. Parts 42 and 44 are formed from a suitable thermoformable plastic material such, for example, as a high density polyethylene and are formed in a suitable heat forming operation such as vacuum forming.

Rear part 42 includes an annular outer portion 42a and a central offal portion 42b. Annular outer portion 42a includes an upper portion 42c, a lower portion 42d, and side portions 42e and 42f. Finger portions 42g extend inwardly from the main body of upper portion 42c.

Front part 44 includes an annular outer portion 44a and a central offal portion 44b. Annular outer portion 44a includes an upper portion 44c, a lower portion 44d, and side portions 44e and 44f. Finger portions 44g extend inwardly from the main body of upper portion 44c and recesses 44h are also provided in the main body of the upper portion 44c at a level beneath finger portions 44g.

Figures 18, 19, 20:
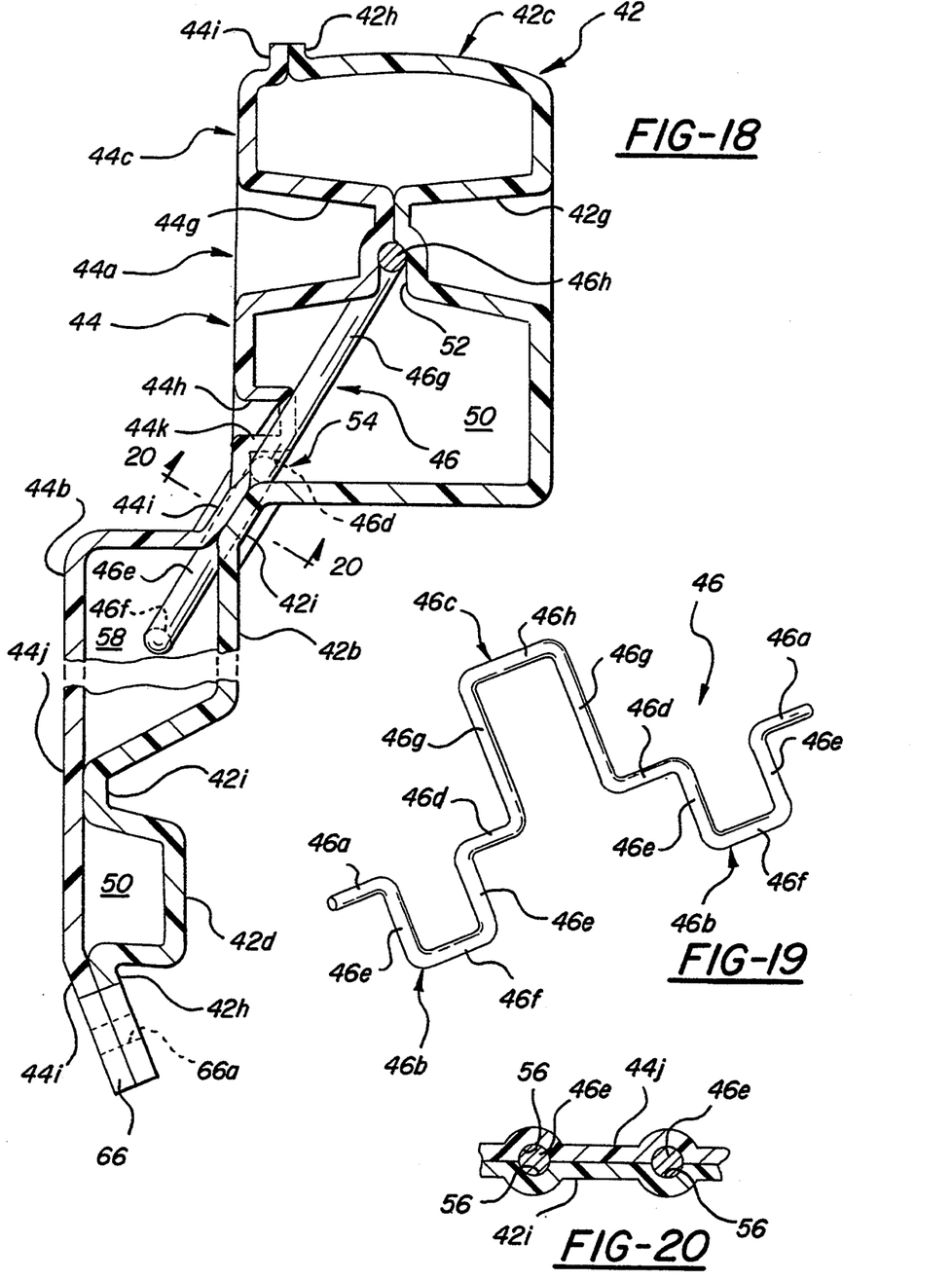
FIG. 19 is a perspective view of a wire element utilized in the frame structure.
FIG. 20 is a cross sectional view taken on line 20—20 of FIG. 18.

Wire elements 46 are formed of any suitable metallic material and include end portions 46a, loop portions 46b, bight portion 46c and connector portions 46d. Each loop portion 46b includes leg portions 46e and a cross portion 46f and bight 46c includes leg portions 46g and a cross portion 46h.

Following the individual heat forming of the parts 42 and 44, and with the parts still in a hot flowable state, parts 42 and 44 are brought together with the wire elements 46 to form the frame structure 36. Specifically, lip portions 42h and 44i are fused together to form an annular outer seam extending around the frame; annular portions 42i and 44j are fused together to form a further annular seam located radially inwardly of the seam formed by lip portions 44i/42h and coact with the seam formed by the lip portions 44i/42h to define an annular hollow or void 50 of varying cross-sectional configuration extending around the frame; finger portions 42g and 44g are fused together at their inner ends to form a passage 52 between the inner ends of the finger portions and within the hollow or void 50; and each wire element 46 is fused between the parts 42 and 44 with cross portion 46h positioned in a passage 52, connector portions 46d and end portions 46a positioned in passages 54 defined between the bottom walls 44k of recesses 44h and the confronting portion of part 42, and loop leg portions 46e passing through grooves 56 defined in parts 42/44 proximate the seam 42i/44j to position loop cross portion 46f in the space 58 between offal portions 44b/42b.

Figure 14:
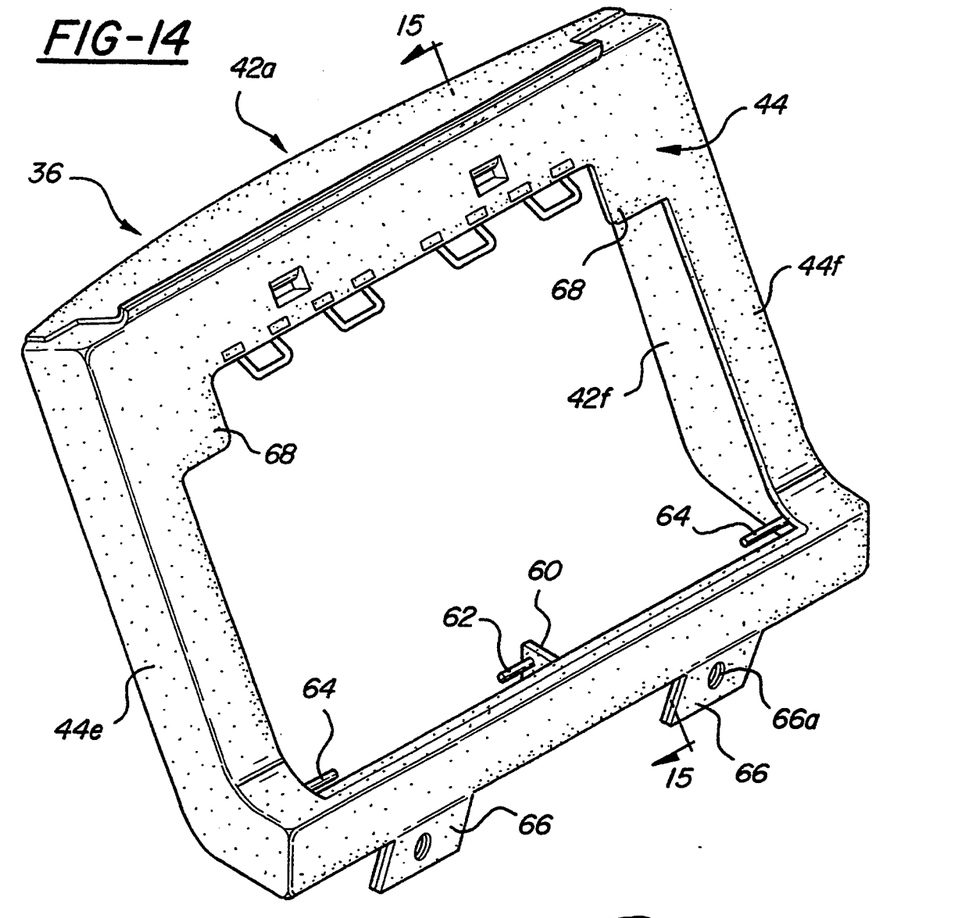
FIG. 14 is a further perspective view of the frame structure of FIG. 12.
Figure 15:
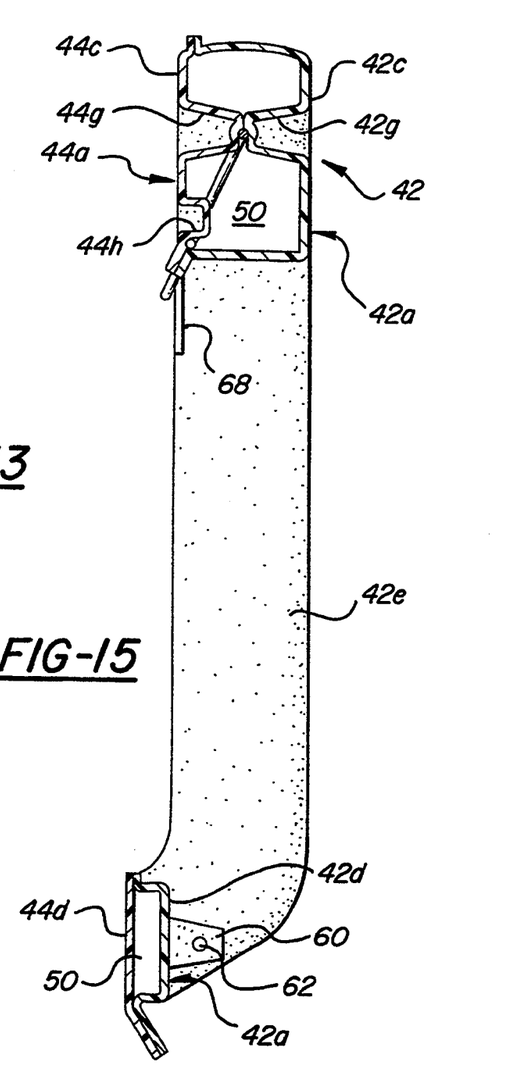
FIG. 15 is a cross-sectional view taken on line 15—15 of FIG. 14.
Figure 16:
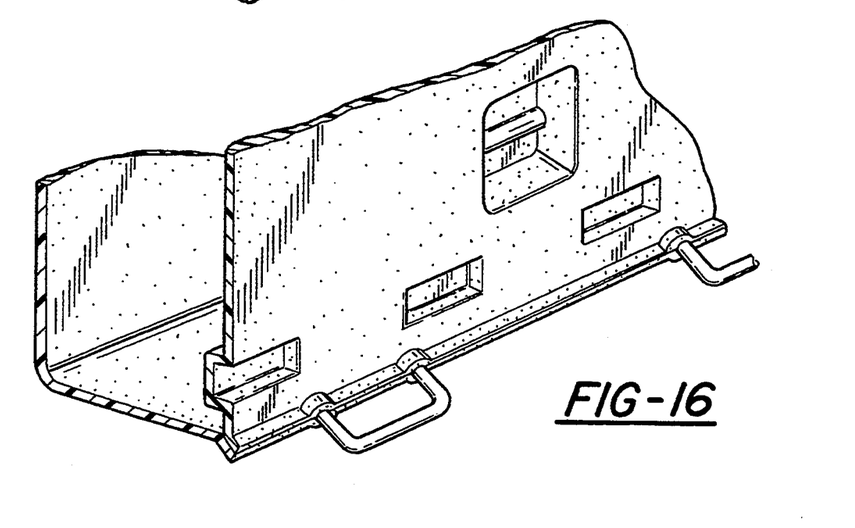
FIGS. 16, 17, and 18 are fragmentary detail views of the frame structure.
Figure 17:
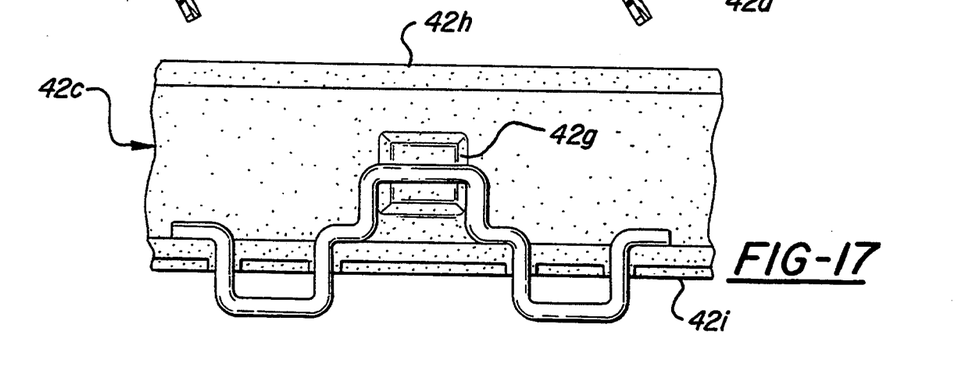

The frame 36 now appears as seen in FIG. 12. Thereafter, the offal portions 42b/44b of the parts 44/42 are removed in a routing or cutting operation to form the frame 36 as seen in FIG. 14. The routing or cutting to remove the offal portions is done along the seam 44j/42i and has the effect of exposing the lower ends of the loop portions 46b of the wire elements 46. To complete the seat back assembly, a pivot plate 60, mounting a pivot pin 62, is suitably secured to the lower portion 42d of part 42 for coaction with pins 64 projecting inwardly from the respective side portions 42e and 42f of part 42 to mount the lower ends of the cushion assemblies 38 for pivotal movement between their upright positions within the frame 36 and their lowered positions providing access to the motor vehicle trunk 40.

Mounting of the frame 36 within the vehicle is facilitated by the exposed loop portions 46b of the wire elements 46 (which serve as a means, for example, to attach the upper portion of the frame to the vehicle) and by flanges 66 formed on the lower portion of the frame proximate seam 44i/42h and including mounting holes 66a for suitable securement the the vehicle. The seat frame 36 also includes stop plate portions 68 to define and delimit the rearward pivotal movement of the seat cushion assemblies 38 and, if desired, suitable latch means (not shown) may be provided on the stop portion 68 to latch the seat back assemblies in their upright positions. It will be understood that the frame structure 36, following its assembling in accordance with the invention methodology, is upholstered with suitable foam and fabric to complete the final seat back assembly.

The invention will be seen to provide a composite plastic and metal structure that utilizes relatively inexpensive materials; that is relatively easy to fabricate utilizing known assembly techniques; and that is extremely durable. Further, in the heat rest application illustrated and described herein, the invention composite structure provides excellent crush resistance in a structure wherein crush resistance is required. In the rear seat back application illustrated and described herein, the invention composite structure provides the attachment loops as an integral portion of the seat back structure, thereby eliminating the need to separately attach the loops to the seat back structure. In all of the disclosed embodiments, the manner in which the metallic member is incorporated into the composite structure in the course of the formation of the twin sheet plastic structure ensures a rigid interrelationship as between the metal member and the plastic structure.

Whereas preferred embodiments of the invention have been illustrated and described in detail, it will be apparent that various modifications may be made in the disclosed embodiments without departing from the scope or spirit of the invention.

I claim:

1. A method of forming a metal and plastic composite structure comprising:
    providing a metallic element having first and second adjoining portions;
    providing a first plastic sheet;
    providing a second plastic sheet;
    individually heat forming said first plastic sheet to form a first rigid self-supporting preform plastic part;
    individually heat forming said second plastic sheet to form a second rigid self-supporting preform plastic part;
    following the individual heat forming of the parts, and with the parts in a hot flowable state, assembling said rigid plastic parts and said metallic element to form a composite assembly with portions of said first and second parts fused together to form a rigid self-supporting hollow twin sheet plastic structure defining a void and an opening into said void, further portions of said first and second plastic parts coacting to embrace said first portion of said metallic element at said opening, further portions of said first and second parts coacting to define a passage within the void spaced from the opening, and said second portion of said metallic element positioned within the void such that it passes through the passage and is clamped between the parts at the passage with the parts out of contact with the metallic element between the opening and the passage.

2. A method according to claim 1 wherein:

said heat forming step further comprises configuring said sheets such that when the plastic parts are positioned together they form a further opening into said void; and said assembly step further comprises positioning said metallic element in said further opening and fusing portions of said plastic parts together proximate said further opening in surrounding relation to said metallic element.

3. A method of forming a metal and plastic composite structure comprising:

providing a metallic rod having first and second adjoining portions;

providing a first plastic sheet;

providing a second plastic sheet;

individually heat forming said first plastic sheet to form a first preform plastic part;

individually heat forming said second plastic sheet to form a second preform plastic part;

following the individual heat forming of the parts, and with the parts in a hot flowable state, assembling said plastic parts and said rod to form a composite assembly with portions of said first and second parts fused together to form a rigid hollow twin sheet plastic structure defining a void, further portions of said first and second plastic parts coacting to embrace said first portion of said rod, and said second portion of said rod positioned within the void defined by said plastic structure;

said heat forming steps comprising configuring said sheets such that when the plastic parts are positioned together they form a hollow plastic structure having a wall and an opening defined in said wall by said further portions and communicating with said void;

said assembly step comprising fusing said first and second plastic parts together proximate said opening with said first portion of said rod passing through said opening to position said second portion thereof within the void defined by said plastic structure and with the first and second parts in surrounding relation to said first portion of said rod, and fusing said first and second plastic parts together in surrounding relation to said rod at a location within said void which is along said rod and spaced from said opening, the parts being out of contact with the rod between said opening and said location.

* * * * *